United States Patent [19]

Iqbal

[11] Patent Number: 4,493,778

[45] Date of Patent: Jan. 15, 1985

[54] WATER-BASED MAGNETIC COATING COMPOSITION

[75] Inventor: Sikandar Iqbal, San Jose, Calif.

[73] Assignee: Memorex Corporation, Santa Clara, Calif.

[21] Appl. No.: 397,986

[22] Filed: Jul. 14, 1982

[51] Int. Cl.³ .............................................. H01F 1/28
[52] U.S. Cl. .............................. 252/62.54; 427/128; 428/500; 428/900
[58] Field of Search ...................... 252/62.54; 427/128

[56] References Cited

U.S. PATENT DOCUMENTS 3,725,285  4/1973  Denk et al. ...................... 252/62.54
4,020,236  4/1977  Aonuma et al. ..................... 428/457
4,336,308  6/1982  Yamada et al. .................. 428/425.9

Primary Examiner—Arthur P. Demers
Attorney, Agent, or Firm—John J. McCormack; Nathan Cass; David W. Heid

[57] ABSTRACT

Disclosure is made of an improved aqueous magnetic coating composition employing a polyacrylic latex polymer as a dispersant. As preferred embodiments, the composition further comprises a polymeric binder having both hard and soft components, as well as the inclusion of flow agents, antifoaming agents, wetting agents and lubricants.

20 Claims, No Drawings

WATER-BASED MAGNETIC COATING COMPOSITION

BACKGROUND OF THE INVENTION

This invention concerns itself with aqueous magnetic coating formulations. It is desirable at times to use aqueous formulations in place of organic formulations for the latter use expensive and toxic flammable solvents, which must be captured upon drying of the magnetic formulation to prevent air pollution. Furthermore, there have been a number of recent developments in improving magnetic aqueous formulations, which make them attractive as substitutes for organic-based coatings generally.

Notwithstanding the inherent advantages of employing aqueous magnetic coating formulations, such coatings have not, to date, replaced organic formulations commercially. One reason for the lack of success is that prior art magnetic coating layers employ emulsifiers or dispersants, which do not form an adequate bond between the magnetic pigments incorporated in the coatings and the water-based binders. As a result, the coatings become brittle as the emulsifiers exude to the coating surface. A further disadvantage of the emulsifiers of the prior art, such as TAMOL 731 which is a sodium salt of a carboxylate sold by Rohm & Haas and TRITON X-100 which is an alkyl aryl polyether alcohol also offered from Rohm & Haas, is their tendency to not only diffuse to the surface of the magnetic coating over time, but also cause the aqueous formulation to foam during preparation. The antifoaming agents employed by the prior art do not completely remedy the problem, particularly in the preparation of high viscosity magnetic coating compositions.

Yet another problem in prior art aqueous-based magnetic coating compositions is the tendency of the magnetic particles and other pigments, such as carbon, to flocculate. The use of improved dispersion agents can not only avoid the flocculation problem, but also stabilize the magnetic powder and other pigments incorporated in the composition.

It is thus an object of the present invention to provide an improved aqueous magnetic coating composition without the drawbacks of prior art compositions.

It is yet another object of the present invention to employ improved dispersing agents in aqueous magnetic coating compositions to avoid those disadvantages outlined above.

These and other objects of this invention will be more fully appreciated when considering the following disclosure.

SUMMARY OF THE INVENTION

The present invention deals with an aqueous coating composition for forming a magnetic recording layer, the improvement comprising the use of a polyacrylic latex polymer as a dispersant. As a preferred embodiment, the polyacrylic latex polymer can comprise a copolymer of styrene and a member selected from the group consisting of butyl acrylate and ethyl acrylate. In such a composition, the styrene is preferably present in an amount between approximately 10–20% by weight, and the remaining acrylate is present in an amount between approximately 80–90% by weight. The styrene-acrylate copolymer preferably has a molecular weight between approximately 20,000–40,000.

The aqueous coating composition, also as a preferred embodiment, can further comprise a water-insoluble polymeric binder having both a hard and soft component. The hard component preferably comprises a member selected from the group consisting of copolymers and terpolymers of acrylonitrile, ethylacrylate, butylacrylate, methylmethacrylate and mixtures thereof. More specifically, the hard component can comprise a copolymer of approximately 10–20% by weight of acrylonitrile and approximately 80–90% by weight of a member selected from the group consisting of ethylacrylate and butylacrylate. Similarly, the hard component can comprise a terpolymer of approximately 10–20% by weight of acrylonitrile, approximately 10–25% by weight ethylacrylate, approximately 60–80% by weight butylacrylate and approximately 10–20% by weight methylmethacrylate.

The soft component making up the aqueous coating composition, as a preferred embodiment, can comprise a polymer emulsion of a polyurethane having a glass transition temperature of between approximately $-10°$ C. to $-40°$ C.

The aqueous coating composition can also employ flow agents, antifoaming agents, wetting agents and lubricants.

DETAILED DESCRIPTION OF THE INVENTION

The aqueous phase of the coating composition can be prepared in a manner taught in copending application Ser. No. 345,082, filed on Feb. 2, 1982. In fact, the present invention can include lubricants in the coating composition as are taught in the referenced co-pending application. More specifically, the aqueous coating composition can comprise lubricants selected from the group consisting of aliphatic and aromatic stearates, silicon oils, perfluoro alkyl polyethers and fluorinated fluids having one of the following structures:

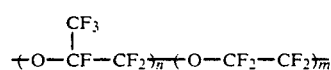

wherein n, m = 40–90 and
Ti F—CF(CF$_3$)CF$_2$O]$_n$·C$_2$F$_5$ wherein N' = 12–45 and mixtures thereof.

The magnetic powders which can be employed in the aqueous coating composition can be selected from the group consisting of $\gamma$-Fe$_2$O$_3$, Fe$_3$O$_4$, as well as other oxides which are doped or surface treated with metal ions, such as cobalt, nickel or chromium. Generally, these magnetic oxides can be characterized as being needle-shaped and having coercivities from 300–800 Oe.

The polymer binders discussed above can be characterized as being latexes of relatively high molecular weight. As previously stated, they preferably comprise polyblends of hard and soft components which provide the toughness which is necessary in magnetic coating compositions. Further, the polyblends of latexes form interpenetrating elastomeric networks in the presence of magnetic pigments.

As a generality, the aqueous magnetic coating composition should comprise the following classes of materials, in the approximate parts by weight as indicated:

| Composition | Parts By Weight |
| --- | --- |
| Magnetic Oxide (or Metal) Powder | 70–80 |
| Dispersing Agents | 1–3 |
| Antifoaming Agents | 0.05–0.1 |
| Flow Agents | 0.5–2 |
| Aqueous Emulsion (25–50% Solids) | 30–20 |
| Lubricants | 1–2 |

The dispersants, flow agents, antifoaming agents and wetting agents can be added to water followed by the addition of the pigments, which are added slowly while subjecting the composition to high shear mixing. The pH of the composition is maintained from approximately 8 to 10 during the processing steps. The magnetic powders are dispersed by milling and the polyblends of latexes are added to the mix. Lubricants and rheology modifiers are later added as a final mixing step.

EXAMPLE 1

Approximately 0.31% (wt.) sodium polyphosphate, as well as approximately 1.05% Acrysol WS-24, which is an acrylic emulsion available from Rohm & Haas Co., were added, as dispersing agents, to approximately 46.69% distilled water and dissolved therein. The pH of the solution was controlled between approximately 8–10 by the addition of sodium hydroxide, although ammonium hydroxide could have been used equally as well.

To this solution was then added approximately 0.47% of a wetting agent, namely, Surfynol 104, an acetylenic glycol available from Air Products Co., and the solution mixed vigorously under high shear. Also under high shear was then added the magnetic oxide, in this case, approximately 31.55% of the mixed oxide $Fe_2O_3$/$Fe_3O_4$. Flow agents can also be included to improve the characteristics of the coating. A suitable flow agent for practicing this invention is Acrysol RM4 which is alkyline-soluble emulsion of ethyl acrylate and acrylic acid sold by Rohm & Haas Co.

Mixing was continued under high shear employing, for example, a "bead" mill utilizing glass, ceramic or steel milling media. After a good dispersion was obtained, which was verified by visual inspection, the latexes were added. In this example, approximately 6.37% of Rhoplex 1024, an acrylic emulsion available from Rohm & Haas Co., was used as the "hard" segment and approximately 12.25% of QW 4147, a polyurethane emulsion available from Quinn as the "soft" segment. High shear mixing was continued and the lubricants were then added. Pre-emulsified lubricants were employed, such as those disclosed in co-pending application Ser. No. 345,082. In this example, approximately 0.80% butoxyethyl stearate, available from Armak, and approximately 0.18% of an emulsion of a silicon oil available from Dow Corning, were used as lubricants.

It was observed that the butoxyethyl stearate acts as an internal lubricant as it is compatible with the latexes used herein. The second lubricant, namely, the silicon oil emulsion was incompatible and thus rises to the surface of the water-based coating in time forming a thin layer of lubricant thereon.

EXAMPLE 2

The following ingredients were incorporated into a solution in the manufacture of a water-based coating composition, the mixing procedure being substantially the same as that taught in Example 1.

| Ingredients | Weight % |
| --- | --- |
| DI Water | 46.09 |
| $Fe_2O_3$/$Fe_3O_4$ Oxide | 31.14 |
| Rhoplex WL91 (Acrylonitrile Acrylic) | 7.58 |
| QW4147 (Polyurethane Emulsion) | 12.09 |
| Acrysol WS-24 (Acrylic Emulsion) | 1.04 |
| Silicon Oil Emulsion | 0.17 |
| Butoxyethyl Stearate | 0.79 |
| Sodium Polyphosphate | 0.31 |
| Surfynol 104 | 0.47 |
| $NH_4OH$ (Ammonium Hydroxide) | 0.32 |
|  | 100.00 |

The formulary of Example 2 differs in substance from that shown in Example 1 through the inclusion of an acrylonitrile acrylic. These materials improve the mechanical properties of the magnetic coating layer by toughening the overall polymeric composition.

It was found that formulations prepared according to the present invention have improved mechanical properties and are smooth and quite glossy after drying and after surface treatment. The signal to noise ratio has been found to be excellent and the output improved principally because of the ability to control the rheological characteristics. By controlling the viscosity of the formulation, one is able to improve the squareness and orientation ratio of magnetic tapes made therefrom while exhibiting very low values in the coefficients of friction.

What is claimed is:

1. In an aqueous coating composition for forming a magnetic recording layer, this layer including magnetic pigment material and a water-based polymeric matrix therefor, this matrix including binder material comprising high molecular weight poly blends of hard and soft polymers adapted to form "interpenetrating elastomeric networks" in the presence of the magnetic pigment;

the improvement comprising the use of sufficient polyacrylic latex polymer, as a dispersant in an aqueous solution to which the pigment is added, to adequately stabilize the pigment material, after mixing, and bond it to the binder material with little or no migration to the surface of the finished recording layer, and also so as to avoid flocculation and aggravated foaming.

2. The aqueous coating composition of claim 1 wherein the polyacrylic latex polymer comprises a terpolymer including styrene and a member selected from the group consisting of butyl acrylate and methylmethacrylate.

3. The aqueous coating composition of claim 2 wherein styrene is present in the polyacrylic latex in an amount between approximately 10–20% by weight and the remaining acrylate is present in the polyacrylic latex in an amount between approximately 80–90% by weight.

4. The aqueous coating composition of claim 2 wherein said copolymer is of a molecular weight between approximately 20,000 to 40,000.

5. The aqueous coating composition of claim 1 further comprising a water insoluble polymeric binder having both a hard and a soft component.

6. The aqueous coating composition of claim 5 wherein the hard component comprises a member selected from the group consisting of copolymers and terpolymers of acrylonitrile, ethyl acrylate, butylacrylate, methylmethacrylate and mixtures thereof.

7. The aqueous coating composition of claim 6 wherein the hard component comprises a copolymer of approximately 10-20% by weight of acrylonitrile and approximately 80-90% by weight of a member selected from the group consisting of ethylacrylate and butylacrylate.

8. The aqueous coating composition of claim 6 wherein the hard component comprises a terpolymer of approximately 6-20% by weight of acrylonitrile, approximately 60-80% by weight ethylacrylate or butylacrylate and approximately 10-20% by weight methylmethacrylate.

9. The aqueous coating composition of claim 5 wherein the soft component comprises a polymer emulsion of a polyurethane having a glass transition temperature of between approximately $-10°$ C. to $-40°$ C.

10. The aqueous coating composition of claim 5 further comprising a flow agent, antifoaming agent, wetting agent and lubricant.

11. The aqueous coating composition of claim 10 wherein said flow agent is an alkyline-soluble emulsion of ethyl acrylate and acrylic acid.

12. The aqueous coating composition of claim 10 wherein said lubricant comprises a member selected from the group consisting of aliphatic and aromatic stearates, silicone oils, perfluoro alkyl polyethers and fluorinated fluids having one of the following structures:

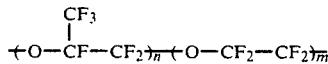

wherein
n = 40-90
m = 40-90 and

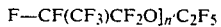

wherein N' = 14-45 and mixtures thereof.

13. The aqueous coating composition of claim 1 wherein the polyacrylic latex dispersant polymer comprises a terpolymer of styrene and a member selected from the group consisting of butyl acrylate and methylmethacrylate, wherein the binder material is comprised of high molecular weight latexes of hard and soft polymers adapted to form "interpenetrating elastomeric networks" in the presence of magnetic pigment.

14. The aqueous coating composition of claim 13 wherein styrene is present in the polyacrylic latex in an amount between approximately 10-20% by weight and the remaining acrylate is present in the polyacrylic latex in an amount between approximately 80-90% by weight, with said copolymer having a molecular weight between approximately 20,000 to 40,000.

15. The aqueous coating composition of claim 14 wherein the hard component polymer comprises a member selected from the group consisting of copolymers and terpolymers of acrylonitrile, ethyl acrylate, butylacrylate, methylmethacrylate and mixtures thereof.

16. The aqueous coating composition of claim 15 wherein the hard component comprises a copolymer of approximately 10-20% by weight of acrylonitrile and approximately 80-90% by weight of a member selected from the group consisting of ethylacrylate and butylacrylate.

17. The aqueous coating composition of claim 14 wherein the soft component polymer comprises a polymer emulsion of a polyurethane having a glass transition temperature of between approximately $-10°$ C. to $-40°$ C.

18. The aqueous coating composition of claim 14 wherein the soft component polymer comprises a polymer emulsion of a polyurethane having a glass transition temperature of between approximately $-10°$ C. to $-40°$ C.; and wherein this aqueous coating composition further comprises a flow agent, antifoaming agent, wetting agent and lubricant; said flow agent comprising an alkyline-soluble emulsion of ethyl acrylate and acrylic acid.

19. The aqueous coating composition of claim 18 wherein said lubricant comprises a member selected from the group consisting of aliphatic and aromatic stearates, silicone oils, perfluoro alkyl polyethers and fluorinated fluids having one of the following structures:

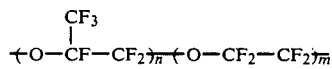

wherein
n = 40-90
m = 40-90 and

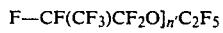

wherein n' = 14-45 and mixtures thereof.

20. The aqueous coating composition of claim 6 wherein the hard component comprises a copolymer or terpolymer of approximately 10-20% by weight of acrylonitrile and approximately 90-80 wt.% ethylacrylate or butylacrylate.

* * * * *

UNITED STATES PATENT AND TRADEMARK OFFICE
CERTIFICATE OF CORRECTION

PATENT NO. : 4,493,778
DATED : January 15, 1985
INVENTOR(S) : Sikandar Iqbal

It is certified that error appears in the above-identified patent and that said Letters Patent is hereby corrected as shown below:

Col. 2, line 46, change "Ti F $-CF(CF_3)CF_2O]_n,C_2F_5$" to
--$F[CF(CF_3)CF_2O]_n,C_2F_5$--;

line 48, change "N'" to --n'--.

Col. 5, line 39, change "$F-CF(CF_3)CF_2O]_n,C_2F_5$" to
--$F[CF(CF_3)CF_2O]_n,C_2F_5$--;

line 41, change "N'" to --n'--.

Col. 6, line 45, change "$F-CF(CF_3)CF_2O]_n,C_2F_5$" to
--$F[CF(CF_3)CF_2O]_n,C_2F_5$--.

Signed and Sealed this

Twenty-seventh Day of August 1985

[SEAL]

Attest:

DONALD J. QUIGG

*Attesting Officer*    *Acting Commissioner of Patents and Trademarks*